United States Patent [19]

Scordo

[11] Patent Number: 4,575,860

[45] Date of Patent: Mar. 11, 1986

[54] DATA CLOCK RECOVERY CIRCUIT

[75] Inventor: Dominick Scordo, Middletown, N.J.

[73] Assignee: AT&T Bell Laboratories, Murray Hill, N.J.

[21] Appl. No.: 588,359

[22] Filed: Mar. 12, 1984

[51] Int. Cl.⁴ .............................................. H04L 7/02
[52] U.S. Cl. .................................. 375/110; 375/119; 328/74
[58] Field of Search ....................... 375/110, 118, 119; 360/51; 370/100; 331/1 A, 45; 307/511, 513, 514, 518, 528; 328/55, 63, 72, 74

[56] References Cited

U.S. PATENT DOCUMENTS

| | | | |
|---|---|---|---|
| 3,333,205 | 7/1967 | Featherston | 328/74 |
| 3,668,315 | 6/1972 | Heitzman | 375/119 |
| 3,819,853 | 6/1974 | Stein | 375/118 |
| 4,208,724 | 6/1980 | Rattlingourd | 375/118 |
| 4,385,396 | 5/1983 | Norton | 375/110 |
| 4,386,323 | 5/1983 | Jansen | 328/63 |
| 4,423,518 | 12/1983 | Hirosaki | 375/20 |

Primary Examiner—Benedict V. Safourek
Attorney, Agent, or Firm—Thomas Stafford

[57] ABSTRACT

Clock recovery pulse signals for use in recovering transmitted data are generated by employing a digitally variable phase oscillator. The variable phase oscillator includes an oscillator having a substantially fixed frequency output signal, a phase encoder and a comparator. Coded phase values of the oscillator output signal are periodically generated by the phase encoder. These coded phase values are compared to a prescribed phase value to generate periodically clock recovery pulse signals. The prescribed phase value is obtained in one embodiment by storing the coded phase value being generated upon the occurrence of an incoming data transition and adding a predetermined phase value to it to center the clock recovery pulse signals substantially in the center of the incoming data eye pattern.

14 Claims, 6 Drawing Figures

DATA CLOCK RECOVERY CIRCUIT

TECHNICAL FIELD

This invention relates to digital communications systems and, more particularly, to the recovery of a clock signal for sampling a received data signal.

BACKGROUND OF THE INVENTION

An essential function in a receiver of digital communication systems is the recovery of a clock signal needed for sampling a received data signal to recover the transmitted data. Typically, this clock recovery function has been obtained by employing a phase locked loop. Phase locked loops include a voltage variable frequency oscillator and a circuit for holding a frequency control voltage. In response to transitions of the received data signal, the phase locked loop corrects the frequency of the voltage variable oscillator and generates the clock signal used to sample the received data signal.

In certain systems data is transmitted using a so-called non-return to zero (NRZ) data system. The NRZ data stream may have long intervals during which there are no data transitions. In the absence of data transitions, the phase locked loop variable oscillator free runs at the last frequency established by the control voltage of the hold circuit. Because of instabilities in the variable frequency oscillator and the hold circuit, the phase of the oscillator drifts and errors result in the data recovery process. Consequently, in systems using phase locked loops for clock signal recovery the interval between data transitions must be restricted in order to minimize the phase drift and, hence, errors in the data recovery.

A further problem with phase locked loops is the need to use the variable frequency oscillator. In many systems this is an added expense.

SUMMARY OF THE INVENTION

Serial data clock recovery is realized by advantageously employing a digitally variable phase oscillator. The variable phase oscillator includes a fixed oscillator, phase coder and comparator. Clock recovery pulses are generated by comparing a coded phase value of the fixed oscillator output to a prescribed phase value.

In one data recovery application, the variable phase oscillator is employed in conjunction with a phase register to obtain the prescribed phase value. The stored prescribed phase value is the phase difference between an incoming data transition and the coded fixed oscillator phase value. That is to say, the stored phase value is the phase coder output at the occurrence of an input data transition. A constant phase value is added to the stored phase value to insure that the received data is sampled near the middle of the data eye pattern.

BRIEF DESCRIPTION OF THE DRAWING

The invention will be more fully understood from the following detailed description of an illustrative embodiment taken in connection with the appended figures in which.

DETAILED DESCRIPTION

Figure 1:
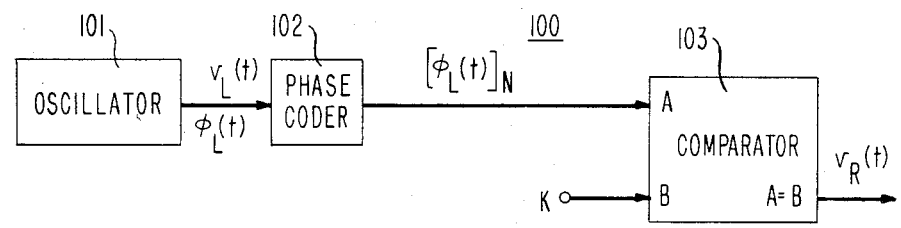
FIG. 1 shows in simplified block diagram form a digitally variable phase oscillator in accordance with the invention.
Figure 2:
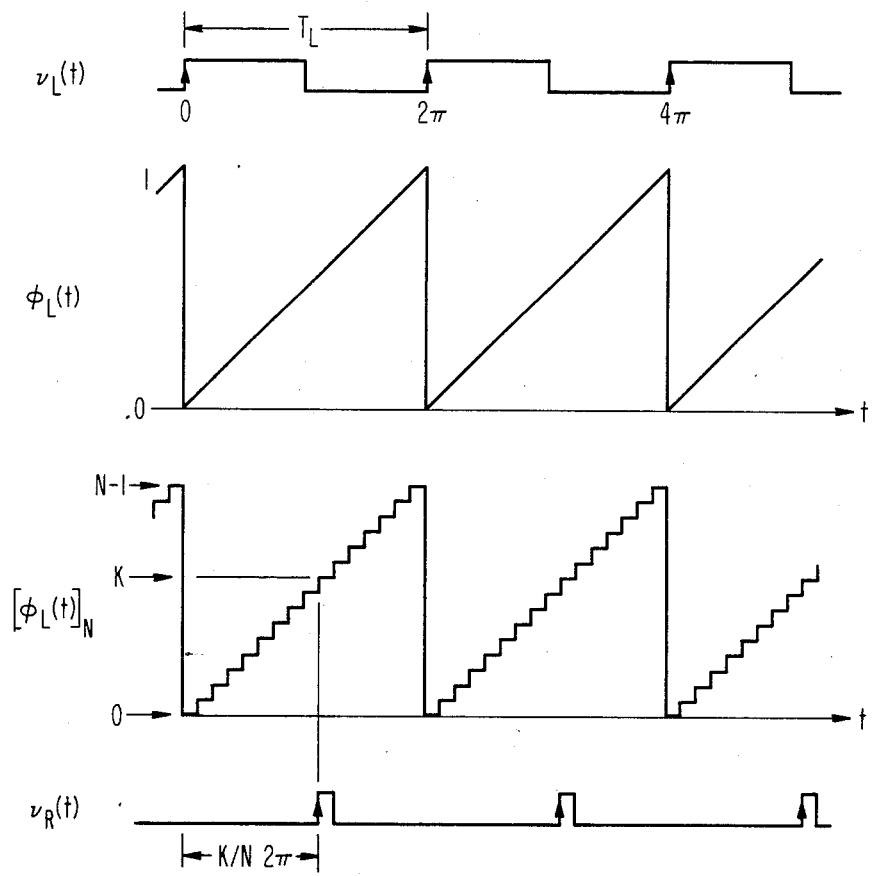
FIG. 2 graphically depicts waveforms that are useful in describing the operation of the embodiment of the invention shown in FIG. 1.

A digitally controllable variable phase oscillator in accordance with the invention is shown in simplified block diagram form in FIG. 1. Accordingly, shown are fixed oscillator 101, phase coder 102 and comparator 103. Fixed oscillator 101 may be any of a number of known oscillators capable of generating a signal $v_L(t)$ having a frequency which is substantially the same as, for example, the nominal baud rate in a data transmission system. Oscillator 101 supplies output signal $v_L(t)$ having phase $\phi_L(t)$ as shown in FIG. 2 to phase coder 102. The continuous phase $\phi_L(t)$ of oscillator 101 output $v_L(t)$ is quantized and encoded by phase coder 102 into N states per input period to generate a digital output represented by periodic waveform $[\phi_L(t)]_N$ having period $T_L$ as shown in FIG. 2. Periodic waveform $[\phi_L(t)]_N$ is supplied in digital to one input (A) of comparator 102 while an arbitrary phase code value K is supplied to another input (B) of comparator 103. The output of comparator 103 is clock recovery pulse signal $v_R(t)$ (FIG. 2) and is generated when $[\phi_L(t)]_N$ (input A) equals K (input B). Clock recovery pulse signal $v_R(t)$ is also periodic with a period $T_L$, and phase $$\phi_R(t) = [[\phi_L(t)]_N + K]_{modN} \quad (1)$$

where K provides, in accordance with an aspect of the invention, and in conjunction with phase coder 102 a phase shift control for clock recovery pulse signal $v_R(t)$ in quantum steps of $2\pi/N$. The pulse width of $v_R(t)$ is $T_L/N$ and it is always preserved if K changes only during the zero portion of the waveform.

Figure 3:
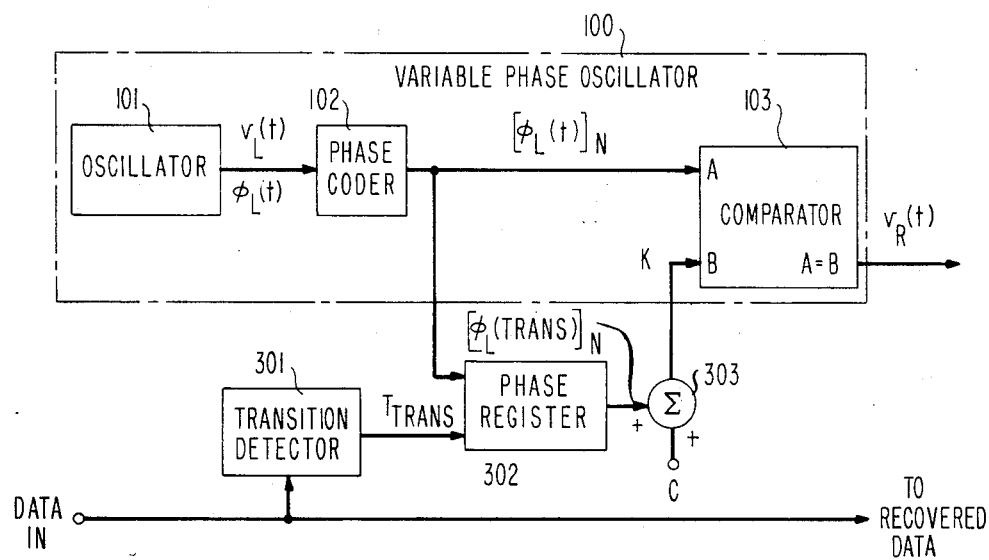
FIG. 3 shows in simplified block diagram form a data clock recovery pulse generator including the invention.
Figure 4:
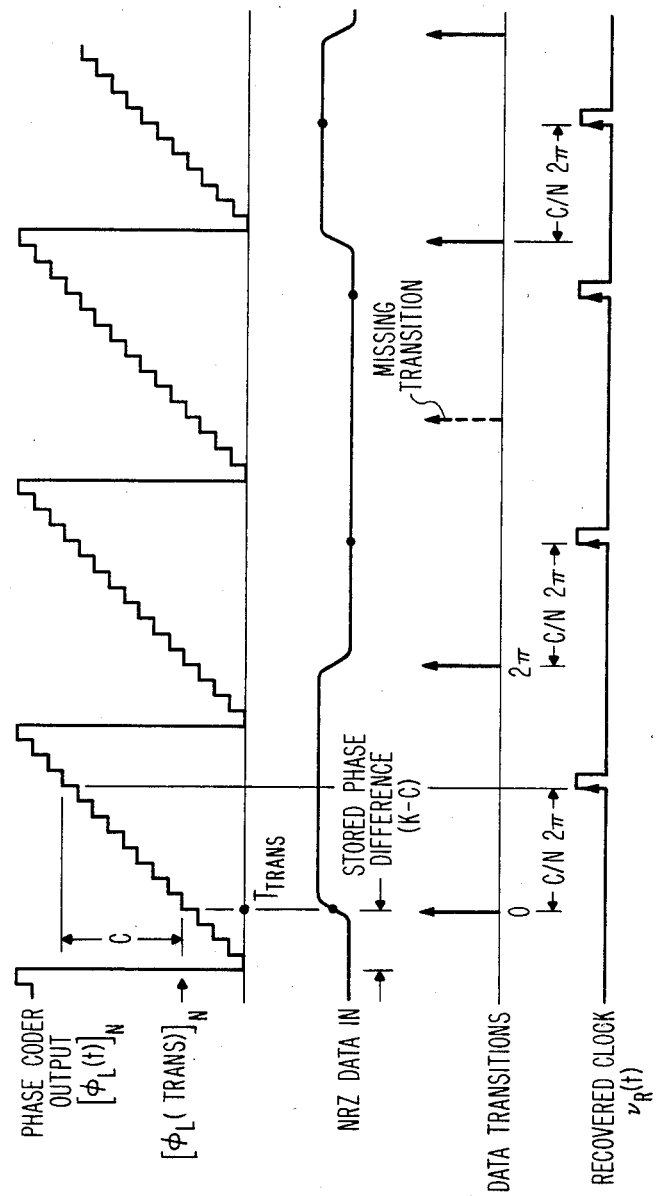
FIG. 4 graphically illustrates waveforms useful in describing the operation of the embodiment of the invention shown in FIG. 3.

FIG. 3 shows in simplified block diagram form an embodiment of the invention for use in digital clock pulse recovery. The elements of the clock pulse recovery arrangement of FIG. 3 which are identical to those shown in FIG. 1 have been similarly numbered. Accordingly, shown are variable phase oscillator 100 including oscillator 101, phase coder 102 and comparator 103, transition detector 301, phase register 302 and summer 303. An incoming data signal, for example, a non-return to zero (NRZ) data signal, is supplied to transition detector 301 which generates pulse signals representative of the data transitions ($T_{TRANS}$) as shown in FIG. 4. It is noted that the NRZ signal can have relatively long intervals of no transitions in the incoming data signal. The $T_{TRANS}$ pulses are supplied to one input of phase register 302. Additionally, digital output $[\phi_L(t)]_N$ from phase coder 102 is supplied to a second input of phase register 302. Register 302 in response to the $T_{TRANS}$ pulse stores the digital value of $[\phi_L(t)]_N$ occurring at the instant of the last data transition, namely $[\phi_L(TRANS)]_N$ as shown in FIG. 4. This digital value is stored until the next data transition occurs.

Adder 303 adds a constant value C to $[\phi_L(TRANS)]_N$ to obtain $$K = [[\phi_L(TRANS)]_N + C]_{mod N} \quad (2)$$

Again where $[\phi_L(TRANS)]_N$ represents the digital phase code value appearing at the output of phase coder 102 at the occurrence of the last input data transition and where C is a fixed phase value offset added modulo-N to the phase value $[\phi_L(TRANS)]_N$ stored in phase register 302. The phase value offset C is chosen so that phase comparator 103 in response to the phase coder 102 output $[\phi_L(t)]_N$ and K generates a clock recovery pulse ($v_R(t)$) C/N2$\pi$ radians from the beginning of the incoming data signal bit period, which corresponds substantially to the middle of the incoming data eye pattern as shown in FIG. 4. In applications where only the rising edges of the incoming data are sufficient for data recovery, transition detector 301 can be eliminated. In situations where the frequency of local oscillator 101 is the same as that of the incoming data after an initial adjustment, the phase of the recovered clock signal $v_R(t)$ remains constant over "long" intervals during which there are no transitions in the incoming data. Consequently, errors possible because of drift in voltage control variable oscillators are used in phase locked loops are eliminated. In situations where the local oscillator frequency differs from the incoming data frequency (bit rate), the phase of the recovered clock signal $v_R(t)$ is adjusted with respect to the phase of the incoming data signal upon occurrence of the incoming data transitions. Again, once the phase of $v_R(t)$ is adjusted it remains constant until the next incoming data transition and only changes then if the frequencies differ.

Figure 5:
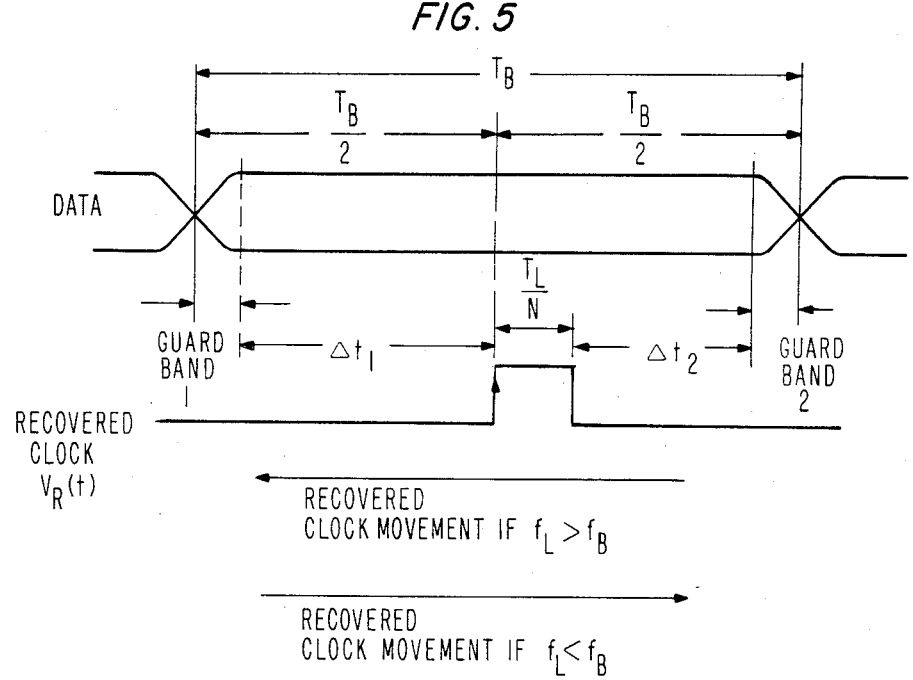
FIG. 5 graphically depicts a relationship between a data bit and the recovered clock pulse useful in describing the limits of phase variation therebetween.

It is important to determine the maximum phase variation between the input data and the local oscillator output that can be tolerated so that no socalled cycle slipping occurs in the absence of input data transitions. This maximum phase variation is defined as the phase "lock limit". A cycle slip is a data bit deletion (or repetition) that results when the phase of the recovered clock $v_R(t)$ moves beyond the data bit boundary during a data transition free interval. FIG. 5 shows the relationship of the incoming data bit boundaries and a pulse of the recovered clock $v_R(t)$. If the recovered clock pulse has been adjusted to within one quantization step of the middle of the incoming data bit period, then $\Delta t_1$ and $\Delta t_2$ represent the maximum phase excursions of the recovered clock in the absence of input transitions so that the phase lock limit is not violated. If the frequency $f_L$, of local oscillation 101 is less than the frequency, $f_B$, of the incoming data, $$\Delta t_1 < \frac{T_B}{2} - J_{pp} - \text{Guard Band 1,} \quad (3)$$

where $T_B$ is the data bit period and $J_{pp}$ is the incoming peak to peak jitter. If the frequency of local oscillator 101 is greater than the frequency of the incoming data, $$\Delta t_2 < \frac{T_B}{2} - \frac{T_L}{N} - J_{pp} - \text{Guard Band 2,} \quad (4)$$

where $T_L$ is the period of the local oscillator output signal. Guard Bands 1 and 2 are margins determined by specific component propagation delays of a particular implementation.

The relative phase excursion $\Delta t_i$, between two periodic waveforms with a fractional frequency difference, $\eta$, after an interval $\tau$ is given by the well known relationship $$\Delta t_i = \eta \tau \quad (5)$$

Therefore, for a given phase excursion constraint, $\Delta t_i$, the maximum number of transition-free data bit periods, m, after an interval $\tau = mT_B$ is given by, $$m < \frac{\Delta t_i}{\eta T_B} = f_B \frac{\Delta t_i}{\eta} \quad (6)$$

where $\Delta t_i$ is either $\Delta t_1$ or $\Delta t_2$ of equation 3 and equation 4, respectively. For a fractional frequency difference $$\eta = \left| \frac{f_B - f_L}{f_L} \right| \quad (7)$$

the maximum number of transition-free data bit periods is given by $$m < f_B \left| \frac{f_L}{f_B - f_L} \right| \Delta t_i \quad (8)$$

Figure 6:
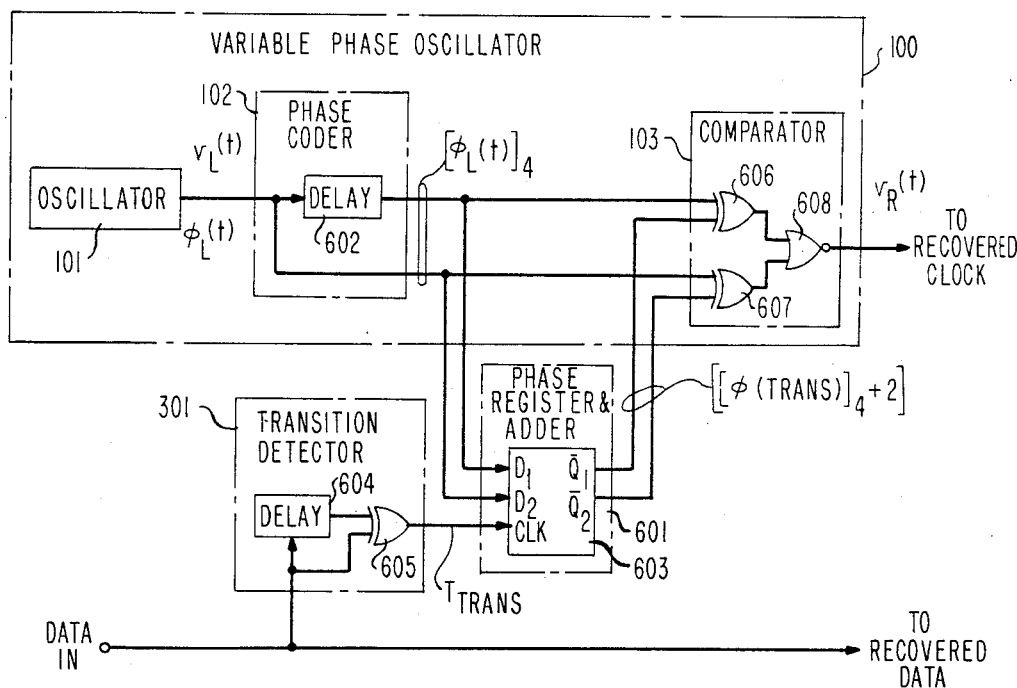
FIG. 6 depicts in simplified block diagram form an implementation of a data clock recovery pulse generator in accordance with the invention.

FIG. 6 shows in simplified block diagram form a specific implementation of the invention for a digital timing recovery application. Accordingly, shown are variable phase oscillator 100 including local oscillator 101, phase decoder 102, and comparator 103, transition detector 202 and phase register and adder 601. In this example, oscillator 101 is a stable fixed oscillator which generates an approximately 32 Mb/sec (32.768) local clock signal $v_L(t)$.

Phase coder 102 includes delay 603 having a delay interval of $T_L/4$ where $T_L$ is the period of $v_L(t)$. Thus, in this example, phase coder 102 quantizes the local oscillator output $v_L(t)$ in four (4) phase steps. The resulting output $[\phi_L(t)]$ is two bits which represent each quarter of a cycle in a Gray-coded format. The two bit Gray-code output from phase coder 102 is supplied to phase register and adder 601 and to comparator 103.

Transition detector 301 includes delay 604 and Exclusive OR gate 605. Detector 301 generates a positive going output pulse $T_{TRANS}$ at the occurrence of each transition (positive and negative) of the input data in well-known fashion. Output $T_{TRANS}$ is supplied to the CLK input of flip-flop 603 in phase register and adder 601.

Phase register and adder 601 comprises dual D type flip-flop 603. The two bit Gray-code output from phase coder 102 is supplied to inputs $D_1$ and $D_2$. The $T_{TRANS}$ output from transition detector 202 is supplied to the CLK input of flip-flop 601. Again, as described above, phase register and adder 601 stores the phase output value $[\phi_L(TRANS)]_4$ from phase coder 102 upon occurrence of a transition in the incoming data plus a constant C which in this example is 2. The complemented output $\overline{Q_1}, \overline{Q_2}$ of flip-flop 603 generates output K by providing an "automatic" modulo 4 addition of the fixed phase offset C which in this example is chosen to be one-half cycle (2 phase code steps). Additionally, since a Gray-code format is being used only one bit of the two bits changes from one phase step to the next. This allows phase register 601 to store the present phase value without any code uncertainties. That is to say, by using the Gray-code format race conditions in the circuit are eliminated because only one bit changes at a time. The complemented output from phase register and adder 601 is supplied to comparator 103.

Comparator 103 includes Exclusive OR gates 606 and 607 and NOR gate 608. As indicated above, comparator 103 operates to generate a positive recovered clock pulse $v_R(t)$ when the output from phase coder 102 $[\phi_L(t)]_4$ equals K, where in this example, $K=[\phi_L(TRANS)]_4+2$.

By employing the instant invention it can be shown that the phase lock limit is not violated for extremely long input data transition free intervals. For example, with the frequency of local oscillation 101 being less than that of the incoming data and if the difference is 100 ppm (parts per million), it can be shown by using equation 6 that for a specific implementation the phase lock limit is not violated for approximately 1638 transition free data bit periods. Similarly, if the local oscillator frequency is greater than that of the incoming date, and if the difference is 100 ppm, it can be shown again by using equation 6 that the phase lock limit is not violated for approximately 1,114 transition free data bit periods. Moreover, if the local oscillator frequency is phase locked to a that data clock there should be no phase variation after the initial phase adjustment. Consequently, there can be an infinite number of no transition data bit periods without incurring an error.

The above-described arrangements are, of course, merely illustrative of the principles of this invention. Numerous other arrangements may be devised by those skilled in the art without departing from the spirit or scope of the invention. For example, the delay line phase coder may be replaced by a modulo-N Gray-code counter and by using a local oscillator frequency that is N times the incoming data rate.

What is claimed is:

1. A variable phase oscillator comprising:
   an oscillator having a substantially fixed frequency output signal;
   means for periodically generating coded phase values of said oscillator output signal, said generating means including means for quantizing the phase value of said oscillator output signal into a predetermined number of phase steps;
   a source of a prescribed phase value; and
   means for comparing said periodically generated coded phase values and said prescribed phase value to periodically generate output pulse signals.

2. The invention as defined in claim 1 wherein the relative phase of said output pulse signals in relationship to said oscillator output signal is dependent on said prescribed phase value.

3. The invention as defined in claim 2 wherein said source of said prescribed phase value includes means for obtaining a phase value which represents the phase difference between said coded phase values and an incoming data transition.

4. The invention as defined in claim 1 wherein said source of said prescribed phase value includes means for obtaining the coded phase value being generated upon occurrence of an incoming data transition.

5. The invention as defined in claim 4 wherein said source of said prescribed phase value includes means supplied with said coded phase values and being responsive to an incoming data transition for storing the coded phase value being generated upon occurrence of said data transition and for adding a predetermined phase value to said stored coded phase value.

6. The invention as defined in claim 4 wherein said source of said prescribed phase value further includes means for adding a predetermined phase value to said obtained coded phase value.

7. The invention as defined in claim 6 wherein said means for obtaining comprises means supplied with said coded phase values and being responsive to said incoming data transition for storing the coded phase value being generated upon occurrence of said data transition.

8. The invention as defined in claim 7 wherein said predetermined phase value is dependent on the incoming data bit period.

9. Data clock recovery apparatus comprising:
   an oscillator having a substantially fixed frequency output signal;
   means for periodically generating coded phase values of said oscillator output signal, said generating means including means for quantizing said oscillator output signal into a predetermined number of phase steps;
   means supplied with said coded phase values and being responsive to an incoming data transition for generating a prescribed phase value in predetermined relationship to a coded phase value being generated upon the occurrence of said data transition; and
   means for comparing said periodically generated coded phase values with said prescribed phase value to generate periodically clock recovery pulse signals.

10. The invention as defined in claim 9 wherein said means for generating said prescribed phase value includes means supplied with said periodically generated coded phase values and being responsive to an incoming data transition for storing the coded phase value being generated upon occurrence of said data transition and for adding a predetermined phase value to said stored coded phase value.

11. The invention as defined in claim 9 wherein said means for generating said prescribed phase value comprises means supplied with said periodically generated coded phase values and being responsive to an incoming data transition for storing the coded phase value being generated upon occurrence of said data transition and means for adding a predetermined phase value to said stored coded phase value.

12. The invention as defined in claim 11 wherein said coded phase values are coded in a Gray-code format.

13. The invention as defined in claim 11 wherein said predetermined phase value is selected in predetermined relationship to the incoming data bit period.

14. The invention as defined in claim 13 wherein said comparing means generates a clock recovery pulse when said supplied coded phase value equals said prescribed phase value.

* * * * *